US012326229B2

(12) United States Patent
Hans-Jörg et al.

(10) Patent No.: US 12,326,229 B2
(45) Date of Patent: Jun. 10, 2025

(54) ILLUMINATION DEVICE FOR A MOTOR VEHICLE HEADLIGHT

(71) Applicant: ZKW Group GmbH, Wieselburg (AT)

(72) Inventors: Riegler Hans-Jörg, Petzenkirchen (AT); Christian Jackl, Wieselburg (AT); Alexander Hacker, Wilhelmsburg (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/568,730

(22) PCT Filed: May 9, 2022

(86) PCT No.: PCT/EP2022/062420
§ 371 (c)(1),
(2) Date: Dec. 8, 2023

(87) PCT Pub. No.: WO2022/258270
PCT Pub. Date: Dec. 15, 2022

(65) Prior Publication Data

US 2024/0271771 A1 Aug. 15, 2024

(30) Foreign Application Priority Data

Jun. 9, 2021 (EP) .................................... 21178455

(51) Int. Cl.
*F21S 41/29* (2018.01)
*F21S 41/143* (2018.01)
(Continued)

(52) U.S. Cl.
CPC ........... *F21S 41/295* (2018.01); *F21S 41/143* (2018.01); *F21S 41/25* (2018.01); *F21S 45/47* (2018.01)

(58) Field of Classification Search
CPC ........ F21S 41/295; F21S 41/143; F21S 41/25; F21S 45/47
See application file for complete search history.

(56) References Cited

U.S. PATENT DOCUMENTS

2012/0113659 A1 5/2012 Hermitte et al.
2016/0146423 A1 5/2016 Lai et al.

FOREIGN PATENT DOCUMENTS

FR 3049682 A1 10/2017
WO WO-2019110475 A1 * 6/2019 ............ F21S 41/143

OTHER PUBLICATIONS

Search Report and Written Opinion for PCT/EP2022/062420 dated Sep. 2, 2022 (13 Pages).

* cited by examiner

*Primary Examiner* — Elmito Breval
(74) *Attorney, Agent, or Firm* — Eversheds Sutherland (US) LLP

(57) ABSTRACT

Illumination device (10) for a motor vehicle headlight, wherein the illumination device (10) comprises the following:

Figure 1:
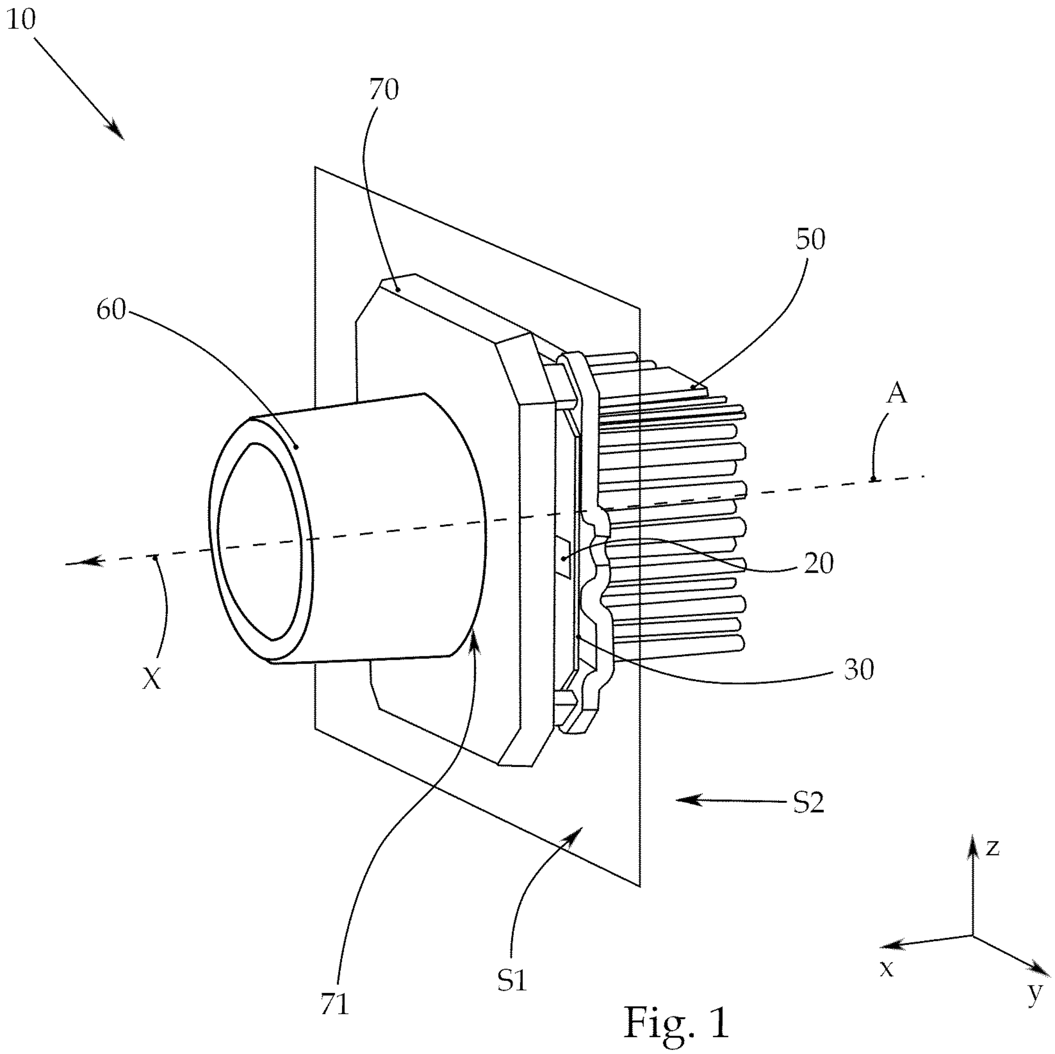

a heat sink (50) with several light sources (20) and projection optics (60), a holding body (70) for holding the projection bodies (60) and the heat sink (50), wherein the heat sink (50) is attached to the holding body (70) by means of an attachment device, wherein the attachment device comprises at least three attachment pairs (100*a*), which are arranged in a cross-section orthogonal to the main emission direction (X) at the same distance to the optical axis (A) of the projection optics (60) about the optical axis (A), wherein an attachment pair (100a) comprises a rib (100) projecting from the holding body (70), which rib extends along an extension plane (E) away from the holding body (70) against the main emission direction (X), and comprises a fixing recess (200) corresponding to the projecting rib (100), which is arranged on the heat sink (50) and passes through it along an axis (X1) parallel to the main emission (Continued)

direction (X), wherein, in the attached state (P1), the rib (100) is in engagement with the fixing recess (200) for each attachment pair (100*a*) in such a way that the rib (100) passes through the corresponding fixing recess (200), that a respective spatial volume (210) is formed between the rib (100) and the fixing recess (200) on opposite sides of the extension plane (E) of the rib (100), in which spatial volumes (210*a*) the adhesive (300) for fixing the rib (100) to the fixing recess (200) is arranged.

8 Claims, 3 Drawing Sheets

(51) Int. Cl.
*F21S 41/25* (2018.01)
*F21S 45/47* (2018.01)

ILLUMINATION DEVICE FOR A MOTOR VEHICLE HEADLIGHT

The invention relates to an illumination device for a motor vehicle headlight, wherein the illumination device comprises the following:

- several light sources, which are arranged on a common control board,
- a heat sink for dissipating heat from the several light sources, wherein the control board with the several light sources is arranged on the heat sink and connected to it in thermal contact,
- projection optics with an optical axis, which projection optics are designed to project the light emitted from the several light sources in the direction of a main emission direction in front of the illumination device,
- a holding body for holding the projection bodies and the heat sink, wherein the projection optics are arranged on a first side of the holding body, and wherein the heat sink together with the control board and the several light sources is attached on a second side of the holding body opposite the first side by means of an attachment device, and wherein the holding body has a luminous opening passing through the holding body for transmitting the emitted light from the light sources such that light from the light sources can be transmitted through the luminous opening from the second side to the first side into the projection optics, wherein the attachment device comprises engagement elements, which are arranged on the holding body, and corresponding counter-engagement elements, which are arranged on the heat sink, which engagement elements are in engagement with the corresponding counter-engagement element in an attached state of the heat sink on the holding body, wherein the attachment device comprises an adhesive for fixing the engagement and counter-engagement elements in engagement with one another, and wherein an engagement element and a counter-engagement element form an attachment pair.

Furthermore, the invention relates to a motor vehicle headlight having at least one illumination device according to the invention.

In known illumination devices from the prior art, after the adhesive has been applied, the adhesive shrinks at all bonding points due to the curing of the adhesive, which leads to the light sources being positioned incorrectly in relation to the projection optics. This results in relative displacements of the heat sink or light sources in relation to the projection optics such that the image to be projected in front of the illumination device becomes blurry or other aberrations can occur, which is not desirable.

It is an object of the invention to provide an improved illumination device.

This object is achieved by virtue of the fact that the attachment device comprises at least three attachment pairs, which are arranged in a cross-section orthogonal to the main emission direction at the same distance to the optical axis of the projection optics about the optical axis,

- wherein the engagement element is formed as a rib projecting from the holding body, which rib extends along an extension plane parallel to the main emission direction of the illumination device away from the holding body against the main emission direction, and wherein the rib extends in a cross-section orthogonal to the main emission direction along a straight line, and
- wherein the counter-engagement element is formed as a fixing recess corresponding to the projecting rib, which is arranged on the heat sink and passes through it along an axis parallel to the main emission direction,
- wherein, in the attached state, the rib is in engagement with the fixing recess for each attachment pair in such a way that the rib passes through the corresponding fixing recess, that a respective spatial volume is formed between the rib and the fixing recess on opposite sides of the extension plane of the rib, in which spatial volumes the adhesive for fixing the rib to the fixing recess is arranged.

Such ribs according to the invention improve the application of the adhesive and its adhesion.

It should be noted that the resulting spatial volume between the rib and the fixing recess for each attachment pair enables a certain amount of play between these components such that the heat sink and light sources can be aligned with the projection optics on the holding body when assembling the illumination device before the rib and the fixing recess are fixed to one another by the adhesive.

It can be provided that the attachment device comprises at least four attachment pairs, wherein two attachment pairs are arranged opposite each other in the attached state in a cross-section orthogonal to the main emission direction in such a way that the respective ribs or the extension planes of the ribs are arranged parallel to one another such that an imaginary virtual connecting line, which is arranged orthogonal to the respective ribs or extension planes of the ribs, intersects the optical axis of the projection optics.

This also optimally compensates for the tensile force in the event of adhesive shrinkage (i.e. shrinkage of the adhesive during curing) as the adhesive shrinkage results in a tensile force along the virtual connecting line for each attachment pair, which is directed away from the optical axis of the projection optics. Due to the fact that two attachment pairs are respectively arranged opposite one another, the resulting tensile forces cancel each other out to such an extent that there is no displacement of the heat sink along the imaginary virtual connecting lines.

It can be provided that the imaginary virtual connecting lines between each two attachment pairs in a cross-section orthogonal to the main emission direction intersect at a 90° angle.

It can be provided that the adhesive is an adhesive that is cured by UV radiation. It is provided that the geometry of the illumination device or heat sink is selected in such a way that the applied adhesive can be irradiated with UV light, i.e. the bonded areas or the adhesive must be accessible for UV radiation.

This reduces the shrinkage of the adhesive, reducing tensile forces that occur when the adhesive is cured.

It can be provided that for each attachment pair, the adhesive is arranged symmetrically to the extension plane in the spatial volumes.

This also directs the direction of the tensile force that occurs when the adhesive is cured along a direction orthogonal to the extension plane in order to produce a controllable tensile force in a defined direction.

Once the heat sink has been aligned with the holding body, the corresponding spatial volumes may not be identical for each attachment pair such that the resulting spatial volume is larger on one side of the extension plane than on the other side of the extension plane. It can be provided that the quantity of adhesive, for example the quantity of UV adhesive in the spatial volumes, also varies, wherein the quantity distribution of the adhesive is in the same ratio as the size of the spatial volumes to each other for each attachment pair, i.e. a smaller quantity of adhesive is arranged in the smaller spatial volumes than in the larger spatial volumes. It can be provided that for each attachment pair, the spatial volumes, which are formed between the rib and the fixing recess on opposite sides of the extension plane of the rib in the attached state, are formed in a cross-section orthogonal to the corresponding extension plane in the form of a wedge with a tapered end in the direction of the main emission direction such that the adhesive arranged therein is also formed as a wedge.

It can be provided that for each attachment pair, the fixing recess has pull-out edges, which extend from the fixing recess into the spatial volumes and form the tapered end of the wedge at least in parts such that the adhesive formed as a wedge and arranged in the spatial volumes is secured against being pulled out in the direction of the main emission direction.

It can be provided that the ribs have a structured surface for increasing the surface area for fixing with the adhesive.

The object is also achieved by a motor vehicle headlight having at least one illumination device according to the invention.

Figure 2:
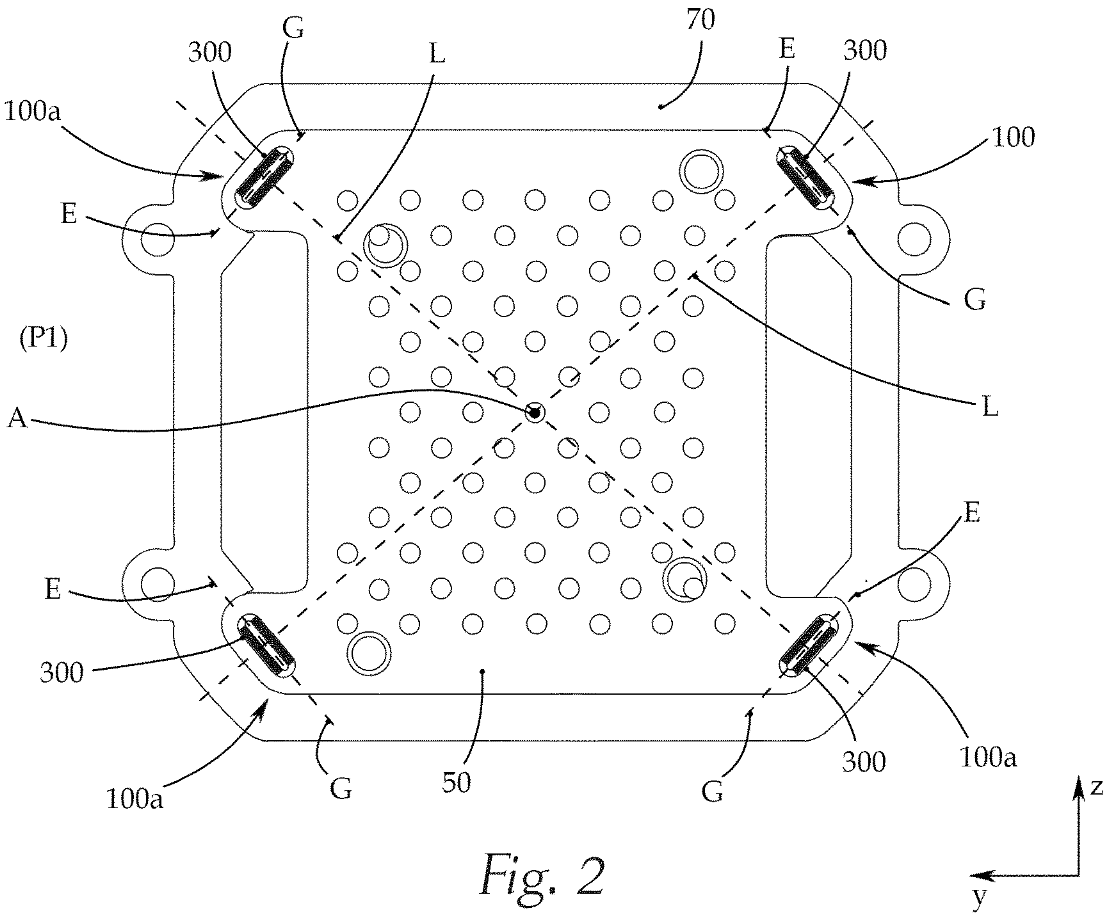
Figure 3:
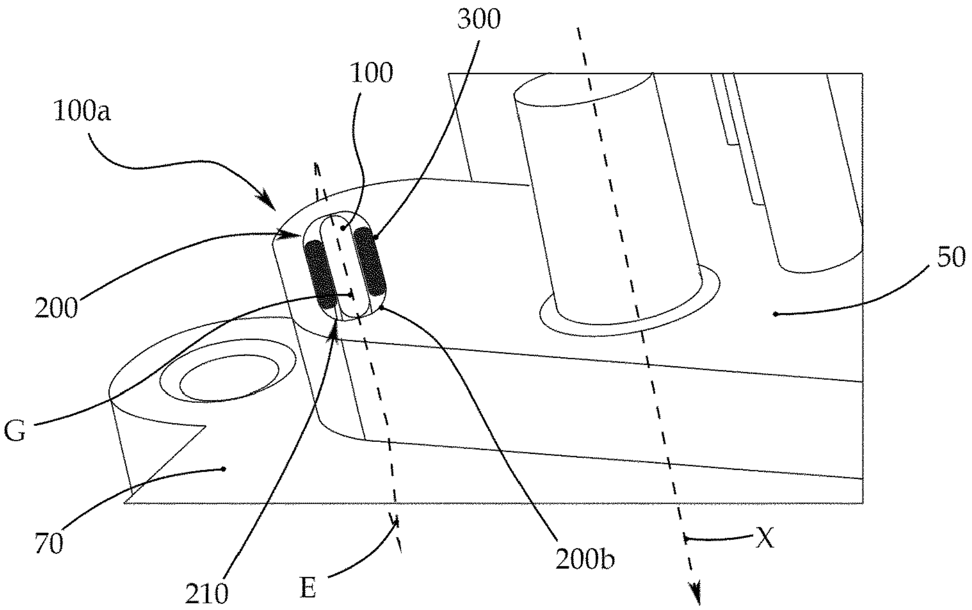
Figure 4:
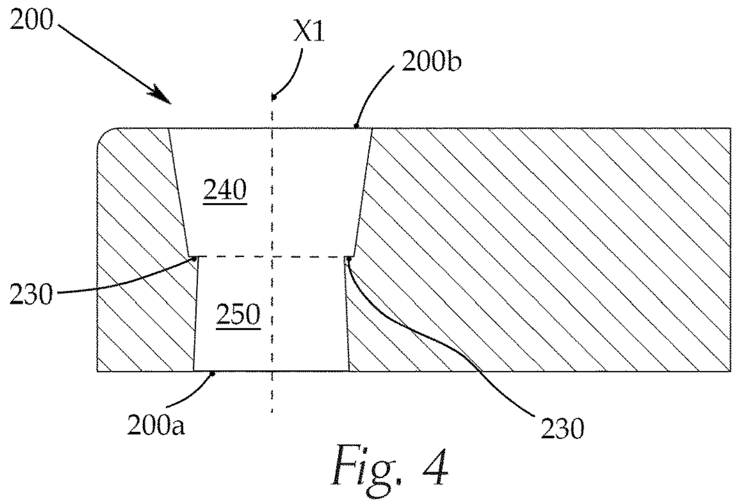
Figure 5:
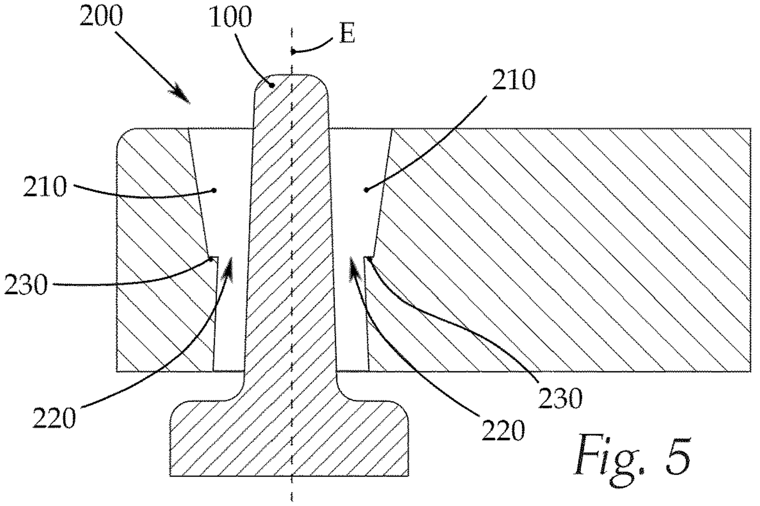
Figure 6:
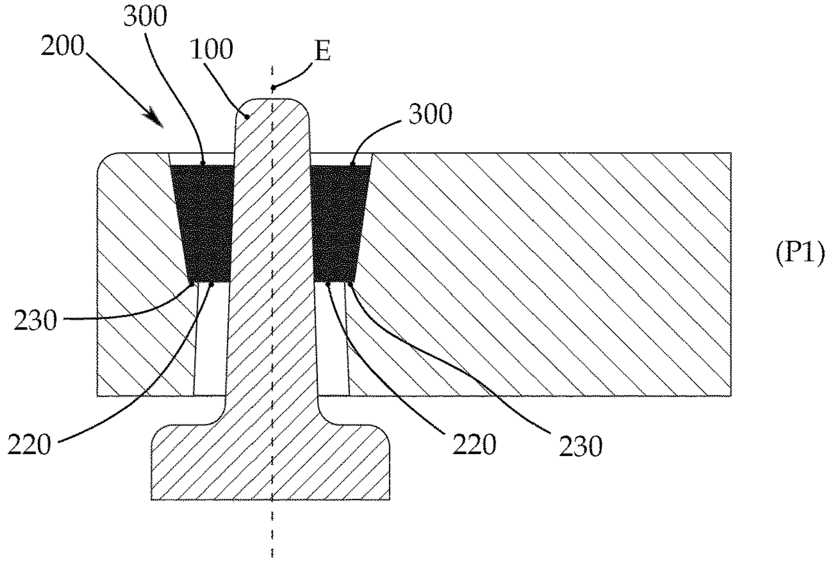

The invention is explained below in more detail based on exemplary drawings. In the drawings, FIG. 1 shows an exemplary illumination device with projection optics and several light sources, which are arranged on a control board, which is attached on a heat sink, wherein the heat sink and the projection optics are arranged or attached on a common holding body, and wherein the illumination device is designed to project light from the light sources in a main emission direction in front of the illumination device, FIG. 2 shows a view of the illumination device from FIG. 1 from behind in the direction of the main emission direction or a cross-sectional view as seen in the main emission direction, wherein the heat sink can be attached to the holding body by means of an attachment device having four attachment pairs, FIG. 3 shows a perspective view of an attachment pair, wherein the attachment pair comprises a fixing recess and a rib passing through the fixing recess, wherein the rib is fixed to the fixing recess by means of an adhesive, FIG. 4 shows a sectional view of the heat sink with a fixing recess, FIG. 5 shows a sectional view of a rib, which is in engagement with the fixing recess from FIG. 4, and FIG. 6 shows a sectional view of the rib in engagement with the fixing recess, wherein the rib is fixed to the fixing recess by means of the adhesive.

FIG. 1 shows an exemplary illumination device 10 for a motor vehicle headlight, wherein the illumination device 10 comprises several light sources 20, which are arranged on a common control board 30, a heat sink 50 for dissipating heat from the several light sources 20, wherein the control board 30 with the several light sources 20 is arranged on the heat sink 50 and thermally connected to it.

The illumination device further comprises projection optics 60 with an optical axis A, which projection optics 60 are designed to project the light emitted from the several light sources 20 in the direction of a main emission direction X in front of the illumination device 10.

Moreover, the illumination device 10 comprises a holding body 70 for holding the projection bodies 60 and the heat sink 50, wherein the projection optics 60 are arranged on a first side S1 of the holding body 70, and wherein the heat sink 50 together with the control board 30 and the several light sources 20 is attached on a second side S2 of the holding body 70 opposite the first side S1 by means of an attachment device.

The holding body 70 has a luminous opening 71 passing through the holding body 70 for transmitting the emitted light from the light sources 20 such that light from the light sources 20 can be transmitted through the luminous opening 71 from the second side S2 to the first side S1 into the projection optics 60.

The attachment device comprises engagement elements 100, which are arranged on the holding body 70, and corresponding counter-engagement elements 200, which are arranged on the heat sink 50, which engagement elements 100 are in engagement with the corresponding counter-engagement element 200 in an attached state P1 of the heat sink 50 on the holding body 70, wherein the attachment device comprises an adhesive 300 for fixing the engagement and counter-engagement elements 100, 200 in engagement with one another. In the example shown, the adhesive 300 is an adhesive that is cured by UV radiation. An illustration of the engagement and counter-engagement elements 100, 200 in engagement in the attached state P1 is shown schematically in FIG. 2.

An engagement element 100 and a counter-engagement element 200 form an attachment pair **100*a*, wherein the attachment device comprises four attachment pairs 100*a* in the example shown, which are arranged in a cross-section orthogonal to the main emission direction X, which cross-section is shown in FIG. 2, at the same distance to the optical axis A of the projection optics 60** about the optical axis A.

The engagement element is formed as a rib 100 projecting from the holding body 70, which rib extends along an extension plane E parallel to the main emission direction X of the illumination device 10 away from the holding body 70 against the main emission direction X, as shown in FIG. 2 and FIG. 3, and wherein the rib 100 extends in a cross-section orthogonal to the main emission direction X along a straight line G.

The counter-engagement element is formed as a fixing recess 200 corresponding to the projecting rib 100, which is arranged on the heat sink 50 and passes through it along an axis X1 parallel to the main emission direction X, as in FIG. 4. The fixing recess 200 extends from an inlet opening **200*a* for inserting the rib 100 to an outlet opening 200*b*, through which the rib 100 can pass and the adhesive 300** can be arranged.

In the attached state P1, the rib 100 is in engagement with the fixing recess 200 for each attachment pair **100*a* in such a way that the rib 100 passes through the corresponding fixing recess 200, that a respective spatial volume 210 is formed between the rib 100 and the fixing recess 200 on opposite sides of the extension plane E of the rib 100, as shown in FIG. 5**.

The adhesive 300 for fixing the rib 100 to the fixing recess 200 is arranged in the spatial volumes **210*a* formed, wherein for each attachment pair 100*a*, the adhesive 300 is arranged symmetrically to the extension plane E in the spatial volumes 210**.

Once the heat sink has been aligned with the holding body, the corresponding spatial volumes may not be identical for each attachment pair such that the resulting spatial volume is larger on one side of the extension plane than on the other side of the extension plane. It can be provided that the quantity of adhesive, for example the quantity of UV adhesive in the spatial volumes, also varies, wherein the quantity distribution of the adhesive is in the same ratio as the size of the spatial volumes to each other for each attachment pair, i.e. a smaller quantity of adhesive is arranged in the smaller spatial volumes than in the larger spatial volumes.

Furthermore, the ribs 100 can have a structured surface for increasing the surface area for fixing with the adhesive 300.

As shown in FIG. 5 and FIG. 6, for each attachment pair 100*a*, the spatial volumes 210, which are formed between the rib 100 and the fixing recess 200 on opposite sides of the extension plane E of the rib 100 in the attached state P1, are formed in a cross-section orthogonal to the corresponding extension plane E in the form of a wedge with a tapered end 220 in the direction of the main emission direction X such that the adhesive 300 arranged therein is also formed as a wedge, as shown more clearly in FIG. 6.

For each attachment pair 100*a*, the fixing recess 200 has pull-out edges 230, which extend from an outer surface of the fixing recess 200 into the spatial volumes 210 and delimit the tapered end 220 of the wedge at least in parts such that the adhesive 300 formed as a wedge and arranged in the spatial volumes 210 is secured against being pulled out in the direction of the main emission direction X.

The fixing recess 200 has an adhesive section 240 as seen in a cross-section parallel to the main emission direction X, in which the adhesive 300 is introduced, and an input section 250. The adhesive section 240 extends from the outlet opening 200*b* of the fixing recess 200 to the pull-out edge 230, wherein the input section 250 extends from the inlet opening 250 to the pull-out edge 230.

Furthermore, two attachment pairs 100*a* are arranged opposite each other in the attached state P1 in a cross-section orthogonal to the main emission direction X in such a way that the respective ribs 100 or the extension plane E of the ribs 100 are arranged parallel to one another such that an imaginary virtual connecting line L, which is arranged orthogonal to the respective ribs 100 or the extension plane E of the ribs 100, intersects the optical axis A of the projection optics 60, as shown in FIG. 2.

The imaginary virtual connecting lines L between each two attachment pairs 100*a* in a cross-section orthogonal to the main emission direction X intersect at a 90° angle in the example shown.

REFERENCE LIST

| | |
|---|---|
| Illumination device . . . | 10 |
| Light sources . . . | 20 |
| Control board . . . | 30 |
| Heat sink . . . | 50 |
| Projection optics . . . | 60 |
| Holding body . . . | 70 |
| Rib . . . | 100 |
| Attachment pair . . . | 100a |
| Fixing recess . . . | 200 |
| Spatial volumes . . . | 210 |
| Tapered end . . . | 220 |
| Pull-out edge . . . | 230 |
| Adhesive . . . | 300 |
| Optical axis . . . | A |
| Extension plane . . . | E |
| Straight line . . . | G |
| Connecting line . . . | L |
| Attached state . . . | P1 |
| First side . . . | S1 |
| Second side . . . | S2 |
| Main emission direction . . . | X |
| Axis . . . | X1 |

The invention claimed is:

1. An illumination device (10) for a motor vehicle headlight, the illumination device (10) comprising:

several light sources (20), which are arranged on a common control board (30);

a heat sink (50) for dissipating heat from the several light sources (20), wherein the control board (30) with the several light sources (20) is arranged on the heat sink (50) and thermally connected to it;

projection optics (60) with an optical axis (A), which projection optics (60) are designed to project the light emitted from the several light sources (20) in the direction of a main emission direction (X) in front of the illumination device (10); and a holding body (70) for holding the projection optics (60) and the heat sink (50), wherein the projection optics (60) are arranged on a first side (S1) of the holding body (70), and wherein the heat sink (50) together with the control board (30) and the several light sources (20) is attached on a second side (S2) of the holding body (70) opposite the first side (S1) by means of an attachment device, and wherein the holding body (70) has a luminous opening (71) passing through the holding body (70) for transmitting the emitted light from the light sources (20) such that light from the light sources (20) can be transmitted through the luminous opening (71) from the second side (S2) to the first side (S1) into the projection optics (60), wherein the attachment device comprises engagement elements (100), which are arranged on the holding body (70), and corresponding counter-engagement elements (200), which are arranged on the heat sink (50), which engagement elements (100) are in engagement with the corresponding counter-engagement element (200) in an attached state (P1) of the heat sink (50) on the holding body (70), wherein the attachment device comprises an adhesive (300) for fixing the engagement and counter-engagement elements (100, 200) in engagement with one another, and wherein an engagement element (100) and a counter-engagement element (200) form an attachment pair (100a), wherein:

the attachment device comprises at least three attachment pairs (100a), which are arranged in a cross-section orthogonal to the main emission direction (X) at the same distance to the optical axis (A) of the projection optics (60) about the optical axis (A), the engagement element is formed as a rib (100) projecting from the holding body (70), which rib extends along an extension plane (E) parallel to the main emission direction (X) of the illumination device (10) away from the holding body (70) against the main emission direction (X), and wherein the rib (100) extends in a cross-section orthogonal to the main emission direction (X) along a straight line (G), the counter-engagement element is formed as a fixing recess (200) corresponding to the projecting rib (100), which is arranged on the heat sink (50) and passes through it along an axis (X1) parallel to the main emission direction (X), in the attached state (P1), the rib (100) is in engagement with the fixing recess (200) for each attachment pair (100a) in such a way that the rib (100) passes through the corresponding fixing recess (200), that a respective spatial volume (210) is formed between the rib (100) and the fixing recess (200) on opposite sides of the extension plane (E) of the rib (100), in which spatial volumes (210a) the adhesive (300) for fixing the rib (100) to the fixing recess (200) is arranged, and the attachment device comprises at least four attachment pairs (100a), wherein two attachment pairs (100a) are arranged opposite each other in the attached state (Pl) in a cross-section orthogonal to the main emission direction (X) in such a way that the respective ribs (100) are arranged parallel to one another such that an imaginary virtual connecting line (L), which is arranged orthogonal to the respective ribs (100), intersects the optical axis (A) of the projection optics (60).

2. The illumination device according to claim 1, wherein the imaginary virtual connecting lines (L) between each two attachment pairs (100*a*) in a cross-section orthogonal to the main emission direction (X) intersect at a 90° angle.

3. The illumination device according to claim 1, wherein the adhesive (300) is an adhesive that is cured by UV radiation.

4. The illumination device according to claim 1, wherein for each attachment pair (100*a*), the adhesive (300) is arranged symmetrically to the extension plane (E) in the spatial volumes (210).

5. The illumination device according to claim 1, wherein for each attachment pair (100*a*), the spatial volumes (210), which are formed between the rib (100) and the fixing recess (200) on opposite sides of the extension plane (E) of the rib (100) in the attached state (P1), are formed in a cross-section orthogonal to the corresponding extension plane (E) in the form of a wedge with a tapered end (220) in the direction of the main emission direction (X) such that the adhesive (300) arranged therein is also formed as a wedge.

6. The illumination device according to claim 5, wherein for each attachment pair (100*a*), the fixing recess (200) has pull-out edges (230), which extend from the fixing recess (200) into the spatial volumes (210) and delimit the tapered end (220) of the wedge at least in parts such that the adhesive (300) formed as a wedge and arranged in the spatial volumes (210) is secured against being pulled out in the direction of the main emission direction (X).

7. The illumination device according to claim 1, wherein the ribs (100) have a structured surface for increasing the surface area for fixing with the adhesive.

8. A motor vehicle headlight having at least one illumination device in accordance with claim 1.

* * * * *